Figure 1:
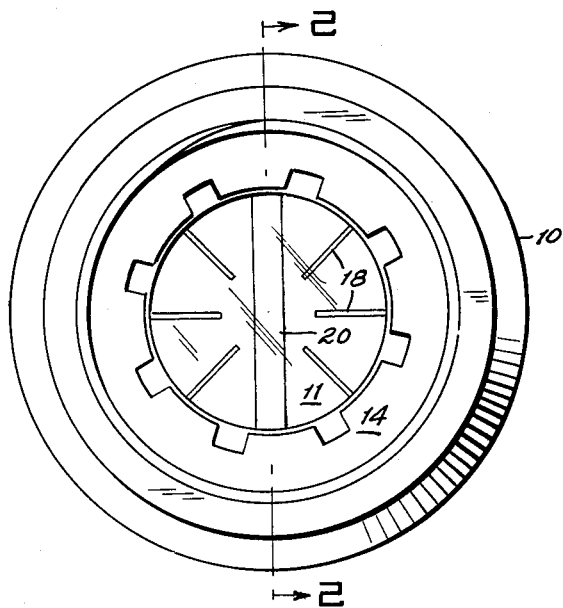

June 9, 1964 P. H. SCHMITT 3,136,293
GO-NO-GO G-INDICATOR
Filed Oct. 5, 1962

INVENTOR.
Paul H. Schmitt
BY
S. J. Rotondi, A. T. Dupont & E. C. Gott 3,136,293
GO-NO-GO G-INDICATOR
Paul H. Schmitt, 782 River Road, Chatham, N.J.
Filed Oct. 5, 1962, Ser. No. 229,290
7 Claims. (Cl. 116—114)
(Granted under Title 35, U.S. Code (1952), sec. 266)

The invention described herein may be manufactured and used by or for the Government for governmental purposes without the payment to me of any royalty thereon.

This invention relates to a device for indicating a peak force has been encountered in the transfer or movement of a body from one point to another.

In designing equipment it is not possible to calculate the peak force or level of acceleration to which it may be subjected in the course of a movement due to human error and acts of God. Failure in equipment due to acceleration forces arises from three principal sources; one is repetitive from vibration and the structure must be designed to satisfactorily resist all expected vibration; a second source is high transient shock which may cause low tensile strength materials or brittle materials to separate and the equipment is ordinarily protected from this force by an attenuating medium; the third force of acceleration is the one to which this invention is directed and is considered that force which will cause damage to the suspended mass in a suspension system or to equipment because the force exceeds the level contemplated by design. Regardless of design there will always be a force level, which if exceeded, will cause damage. For example, a suspended mass in a suspension system and container are designed to drop a certain height without damage, and if the design level drop is exceeded, the assembly will be damaged. The G-indicator of this invention will show that the level of drop has been equalled or exceeded.

It is therefore an object of this invention to provide an indicator for attachment to a body to record whether or not the acceleration force from any direction of a selected design level shall have been reached or exceeded at least once during movement. This object is attained by the use of rods to puncture a spherical envelope when subjected to an acceleration or deceleration force of constant magnitude, regardless of direction.

This invention provides a method of carrying out this object by utilizing a thin-walled sphere containing a dense fluid, the strength of the wall carefully designed so as to be punctured when an acceleration force of selected value has been reached or exceeded. The sphere is centrally supported by pins within a sealed container which may also be filled with a fluid, but one of less density. The sealed container is provided with an interior viewing means by a window, and when the selected level is reached, the pins puncture the sphere causing the fluids to mix and the color and/or tone change of the mixture as viewed through the window provides a permanent record that the design level has been reached or exceeded. Likewise, if there is no change of color in the G-indicator, the information is definite that the chosen level has not been attained at anytime during movement.

Figure 3:
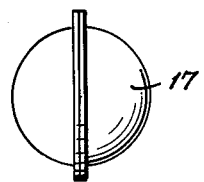
Figure 2:
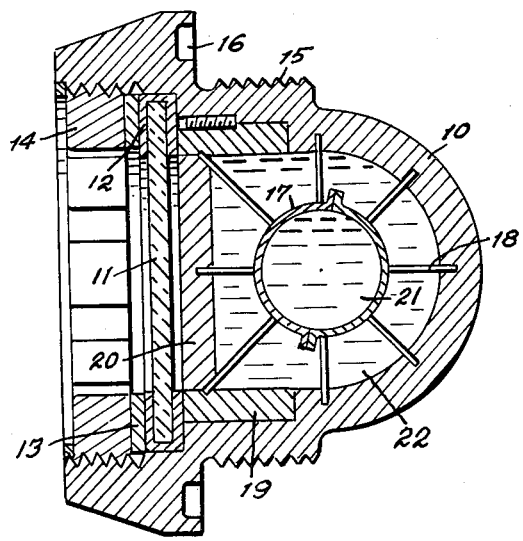
Figure 4:
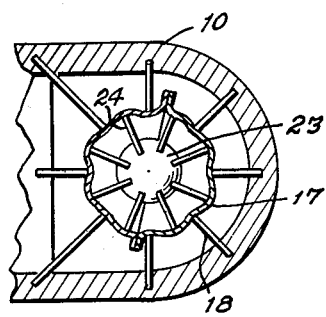
Figure 5:
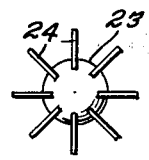

This embodiment of the invention will be more clearly understood by reference to the drawing in which;

FIGURE 1 is a top view of the G-indicator,
FIGURE 2 is a sectional view of the device taken on the line 2—2 of FIGURE 1,
FIGURE 3 is a view of the spherical envelope used in FIGURES 1 and 2,
FIGURE 4 is a sectional view of a modified form of the spherical envelope, and
FIGURE 5 shows a ball holding interior rods as employed in FIGURE 4.

In the drawing, the G-indicator is enclosed in an annular housing 10 having an opening covered by a window 11 fitted in the opening and made fluid tight with a seal 12 which is secured by a washer 13 held by a threaded plug 14. The housing may be attached to a vehicle or to a panel by the threads 15 using the groove 16 to seal the attachment. The method of attachment to the mass is not pertinent to the invention except that the attachment must be a rigid joint. Other structural shapes may be used. A thin-walled sphere or spherical envelope 17 is placed within the housing 10 and supported therein by rods 18 secured to the housing and directed toward the center from all directions and if long enough all of the rods would intersect at the center. However, the rods 18 are of a length that permits a sphere of the desired diameter to be placed in the middle. The sphere 17 is filled with a dense fluid 21 and designed to withstand acceleration forces up to a selected point and thereafter be ruptured by one or more of the rods 18 depending on the direction of the force at the time the design level is equalled or exceeded. To facilitate the insertion and replacement of the sphere 17 from the housing 10, the rods 18 that protrude from the opening covered by the window 11 are assembled in a removable unit consisting of a ring 19 with a cross bar 20 across the ring with additional rods 18 fastened to both members. The remaining space in the housing 10 is filled with a fluid 22 of lighter density and if the sphere 17 is punctured, the fluids 21 and 22 mix and change in a manner that indicates the predetermined G level regulated by the strength of the sphere has been reached by change in color and/or in tone.

There is a margin of error inherent in the device described because the acceleration force acting along a rod may be less than that acting between the rods to cause rupture of the sphere. It is estimated that this error is not more than 6% and this may be reduced materially by using the modification shown in FIGURE 4 which employs a greater number of rods thereby reducing the space between the rods, so that the force transmitted to one or more rods for the puncture has a greater probability of being the peak force rather than the one exerted between the rods.

Referring to FIGURE 4 which shows within the sphere 17 a ball 23 carrying interior rods 24 of the same type as the rods 18 but bearing on the interior of the sphere 17 and for the same purpose as the rods 18, namely for support of the ball and puncture of the sphere. The construction is such that the spherical envelope or sphere 17 fits with some pressure against the rod ends so that there will be no striking contact with any of the rods when the device is vibrated. For this particular modification 26 internal rods 24 and 26 external rods 18 are employed to obtain the desired accurate results.

The fluids selected must have a small change in viscosity and in volume from −90° F. to +220° F. and the fluid chosen for the inside of the spherical envelope must have a density at least twice that of the fluid surrounding the sphere in the sealed container. This difference in density is essential since the heavier fluid within the sphere permits the latter to emulate a suspended mass. The choice of the fluids should be such, that upon rupture of the sphere there is a significant change in color or tone or any indicator that will immediately show the design level has or has not been reached. Such fluids may be similar to those developed for hydraulic systems in aircraft, or a lead salt may be added to increase the weight of the fluid inside the sphere. Also a phenol material may be added to indicate pH, so that there is a color change due to pH change when the solutions are mixed. Further possibilities are the use of "invisible ink" materials in the solutions so the mixing changes clear solutions to a dark color or the use of silicone fluids employing dyes that upon rupture produce a different color or tone.

The Go-No-Go G-indicator has many advantages in that it is small, compact and no adjustment is necessary after assembly, requires no external power, is constantly ready for use and suffers no deterioration from continued storage. The only variable factor present is the strength of the sphere, and the sphere may be changed when it is desired to change the design level of the instrument. The pins or rods 18 causing puncture will be of different shapes along with changes in envelope thickness to provide desired G level indication. Also since the design level for rupture may be known only to the user, the information disclosed by the instrument may be kept secret if so desired.

While this device in this instance is applied to airframe usage, it may also find application in other movement problems.

What is claimed is:

1. A G-indicator attached to a moving vehicle comprising a sealed housing with a window in the face thereof, a frangible envelope within said housing for indicating by rupture if a design level acceleration force from any direction has been reached or exceeded during movement of said vehicle and means within and without said envelope either capable of making the rupture independently.

2. A G-indicator attached to a moving vehicle comprising a sealed housing with a window in the face thereof, means within said housing regulated to rupture when design level of acceleration force from any direction is equalled or exceeded and liquid means surrounding the first means also within said housing for indicating the condition of the first named means whereby it may be determined if the design level of acceleration force was reached at any time during movement of said vehicle.

3. A G-indicator attached to a moving vehicle comprising a sealed housing with a window in the face thereof, flexible means within said housing adapted to be ruptured by a predetermined force, said flexible means containing a fluid of heavy density and surrounded within the housing by a fluid of lighter density, means for supporting said flexible means and adapted to rupture same if a design level acceleration force is reached whereby the mixing of the liquids after rupture will indicate permanently that the design level has been equalled or exceeded during movement of said vehicle.

4. A G-indicator attached to a moving vehicle comprising a sealed housing with a window in the face thereof, said housing containing a fluid of comparatively light density, flexible means within said housing adapted to be ruptured by a predetermined force, said flexible means filled with a fluid whose density is at least twice that of the first named fluid, means for supporting said flexible means within said housing and adapted to rupture said means if a design level acceleration force is reached whereby the mixing of the liquids after rupture will indicate permanently that the design level has been equalled or exceeded during movement of said vehicle.

5. A G-indicator attached to a moving vehicle comprising a sealed housing with a window in the face thereof for observance of the interior of said housing, pins keyed to the interior of said housing and directed toward a center point, a spherical envelope containing a dense fluid centrally located in said housing and resting on said pins, said envelope made of a thin-skinned material which may be ruptured by the pins when a design level acceleration force from any direction is equalled or exceeded, said envelope immersed in a fluid of lighter density occupying the remaining space in the housing whereby the rupture of the envelope will cause the two fluids to mix and indicate by color or tone change that the design level of acceleration has been equalled or exceeded at some time during movement of said vehicle.

6. A G-indicator attached to a vehicle designed for flight comprising an annular housing with an opening in the face closed and sealed by a removable window, a removable annular ring inside of the housing and adjacent to the window with a cross bar, pins keyed to the interior of said housing and directed to a center point, said ring and cross bar utilized as supports for the additional pins necessary to cover the window opening, a spherical envelope containing a fluid of high density centrally located in said housing and resting on said pins, said envelope made of thin-skinned material which may be ruptured by the pins when a design level acceleration force from any direction is reached, said envelope immersed in a fluid of less density than the fluid within the envelope occupying the remaining space in the housing so that the rupture of the envelope will cause the two fluids to mix and indicate by color and/or tone change that the design level of acceleration has been equalled or exceeded at some time during the flight.

7. A G-indicator as claimed in claim 6 wherein the interior of the spherical envelope also contains a ball centrally positioned within the envelope by interior pins of equal length which may also cause rupture of the spherical envelope.

References Cited in the file of this patent
UNITED STATES PATENTS

| | | |
|---|---|---|
| 2,601,440 | Kerrigan | June 24, 1952 |
| 2,679,819 | Torcheux | June 1, 1954 |
| 2,881,276 | Mintz | Apr. 7, 1959 |
| 2,976,732 | Hautly | Mar. 28, 1961 |
| 3,021,813 | Rips | Feb. 20, 1962 |

FOREIGN PATENTS

| | | |
|---|---|---|
| 708,105 | France | Apr. 27, 1931 |
| 1,077,761 | France | May 5, 1954 |